(12) United States Patent
Friel, Sr.

(10) Patent No.: US 7,354,612 B2
(45) Date of Patent: Apr. 8, 2008

(54) HIGH SPEED BAKING IN NOVEL TOASTING APPARATUS

(75) Inventor: Daniel D. Friel, Sr., Greenville, DE (US)

(73) Assignee: Edgecraft Corporation, Avondale, PA (US)

( * ) Notice: Subject to any disclaimer, the term of this patent is extended or adjusted under 35 U.S.C. 154(b) by 239 days.

(21) Appl. No.: 11/354,757

(22) Filed: Feb. 15, 2006

(65) Prior Publication Data

US 2006/0134288 A1    Jun. 22, 2006

Related U.S. Application Data

(60) Division of application No. 10/428,143, filed on Apr. 30, 2003, now Pat. No. 7,036,424, which is a division of application No. 09/917,996, filed on Jul. 30, 2001, now Pat. No. 6,584,889, which is a continuation-in-part of application No. 09/569,841, filed on May 12, 2000, now Pat. No. 6,267,044.

(60) Provisional application No. 60/133,914, filed on May 13, 1999.

(51) Int. Cl.
 *A47J 37/08* (2006.01)
(52) U.S. Cl. .............. 426/233; 426/505; 426/523
(58) Field of Classification Search .............. 426/231, 426/233, 505, 523; 99/327, 329 P, 329 RT, 99/330, 340, 392, 399, 400, 401
See application file for complete search history.

(56) References Cited

U.S. PATENT DOCUMENTS

| | | | | | |
|---|---|---|---|---|---|
| 2,101,967 | A | * | 12/1937 | Walterspiel | 99/444 |
| 2,631,523 | A | * | 3/1953 | Olving | 99/326 |
| 2,862,441 | A | * | 12/1958 | Schmall | 99/340 |
| 4,290,349 | A | * | 9/1981 | Fiorenza | 99/388 |
| 4,345,145 | A | * | 8/1982 | Norwood | 219/492 |
| 5,193,439 | A | * | 3/1993 | Finesman et al. | 99/327 |
| 5,317,960 | A | * | 6/1994 | Cumfer | 99/391 |
| 5,705,791 | A | * | 1/1998 | Sutton et al. | 219/492 |
| 6,192,790 | B1 | * | 2/2001 | Balandier | 99/390 |
| 6,267,044 | B1 | * | 7/2001 | Friel, Sr. | 99/327 |
| 6,584,889 | B2 | * | 7/2003 | Friel, Sr. | 99/327 |
| 7,036,424 | B2 | * | 5/2006 | Friel, Sr. | 99/327 |

* cited by examiner

*Primary Examiner*—Drew Becker

(57) ABSTRACT

An electric baking oven includes an open mesh vertically oriented baking basket to hold food while the food is baked in air by a programmed combination of radiant and convective and conductive energy transfer. An electrical programming control controls the energy from vertically oriented toaster heating elements located juxtaposed to the large vertical faces of the basket and from at least one elongated heating member located below the vertical baking basket with the axis of the elongated heating member oriented nominally horizontal and parallel to the longer horizontal axis of the vertically oriented baking basket.

16 Claims, 8 Drawing Sheets

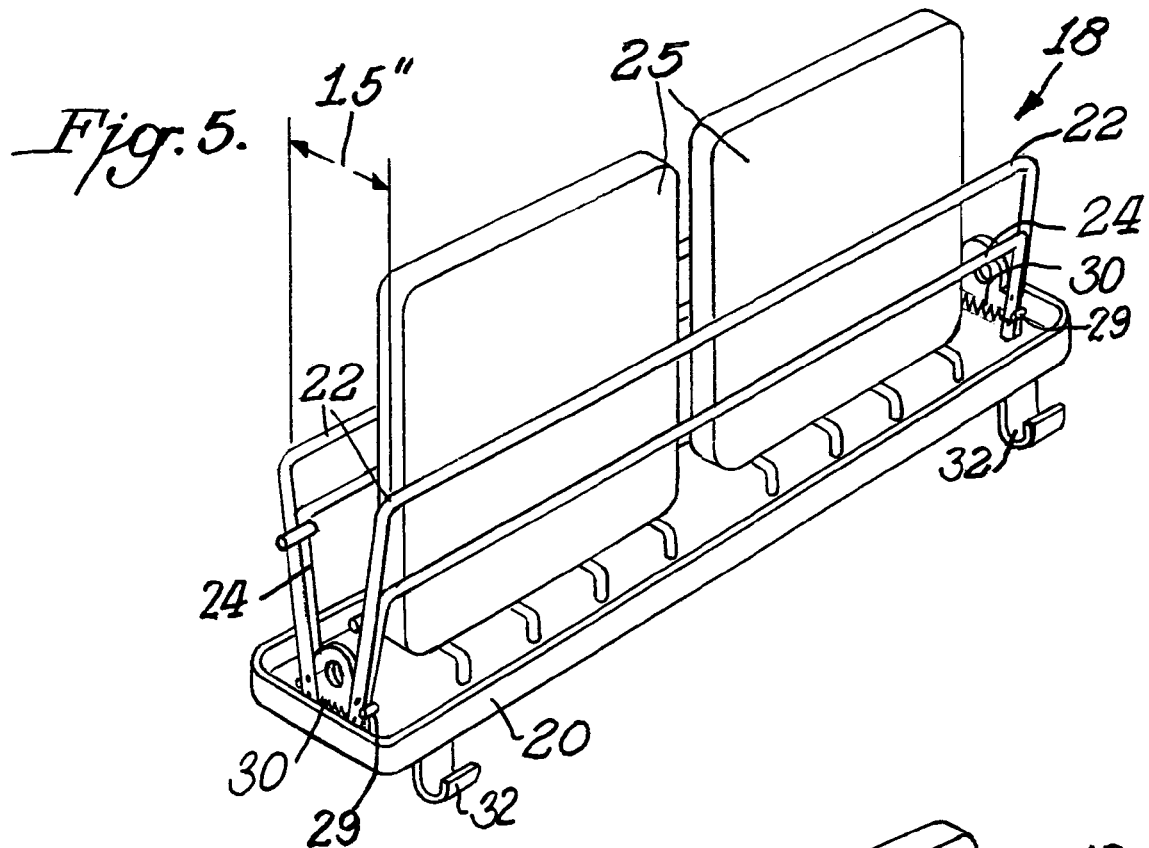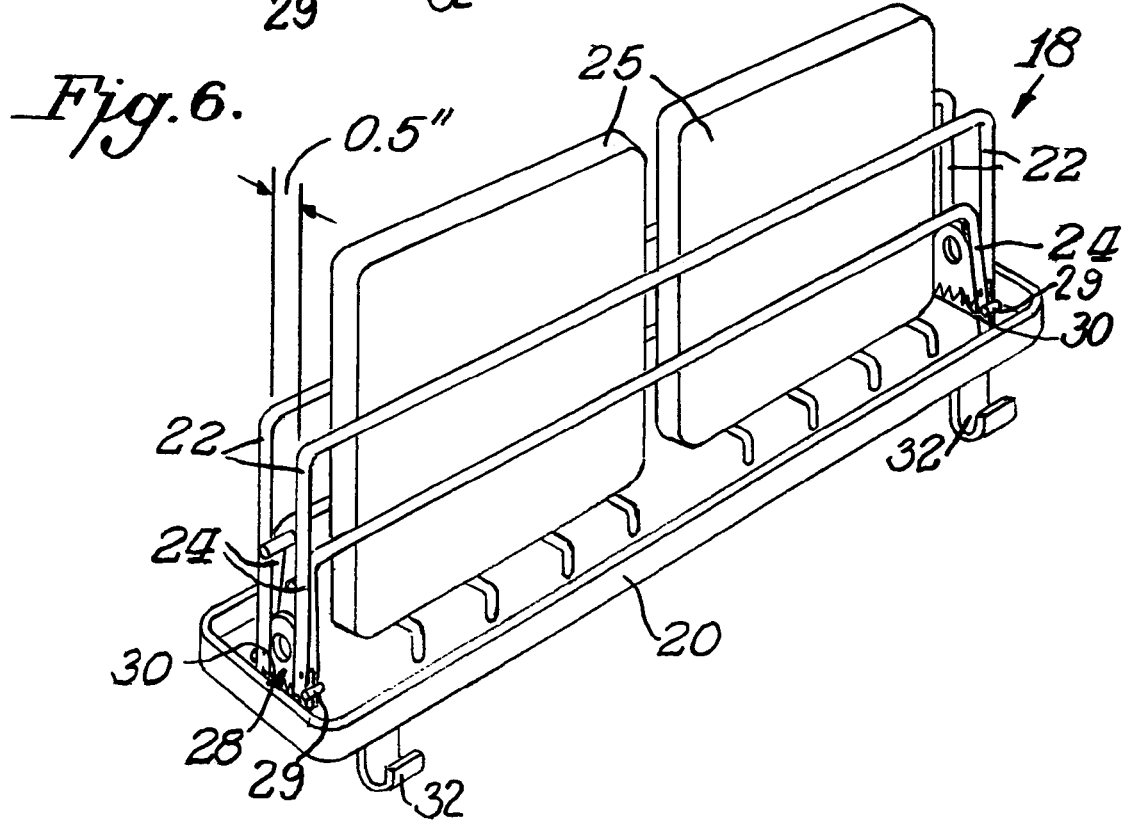

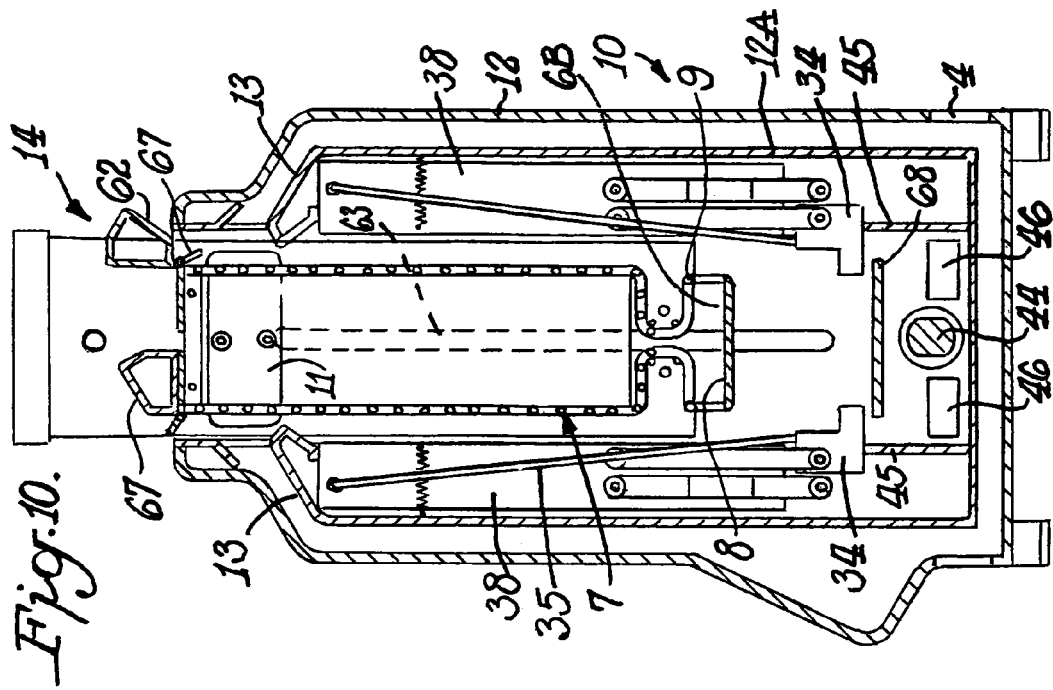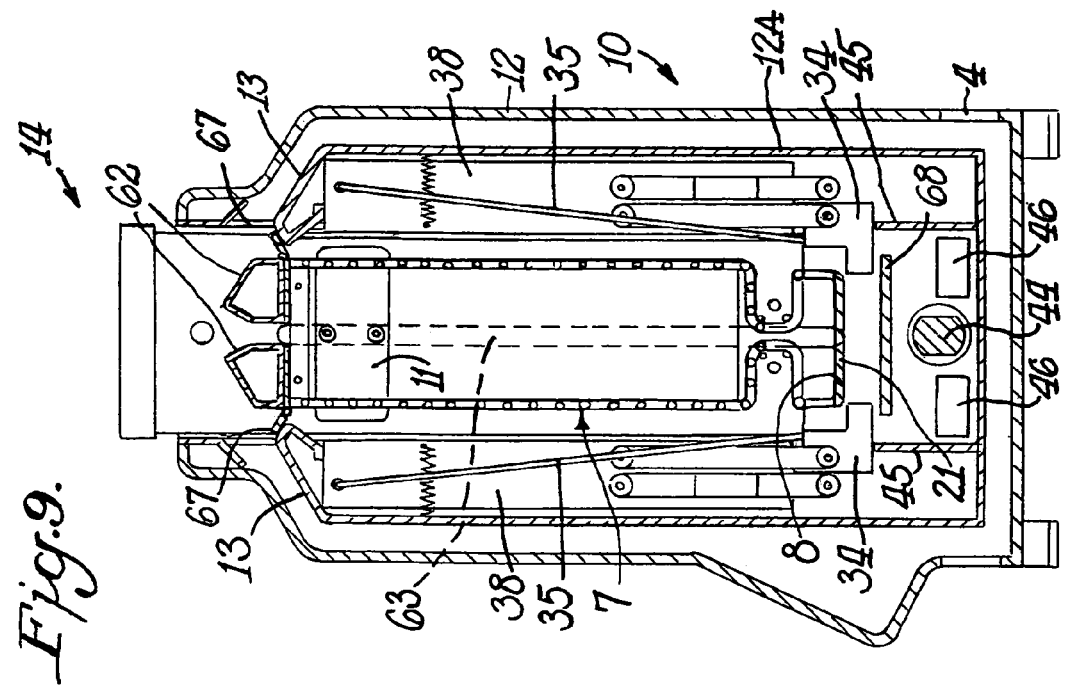

HIGH SPEED BAKING IN NOVEL TOASTING APPARATUS

CROSS REFERENCE TO RELATED APPLICATIONS

This application is a division of application Ser. No. 10/428,143, filed Apr. 30, 2003 now U.S. Pat. No. 7,036,424, which is a division of application Ser. No. 09/917,996, filed Jul. 30, 2001 now U.S. Pat. No. 6,584,889, which is a continuation in part of application Ser. No. 09/569,841, filed May 12, 2000, now U.S. Pat. No. 6,267,044, which is based on provisional application, Ser. No. 60/133,914, filed May 13, 1999.

BACKGROUND OF INVENTION

Parent U.S. Pat. No. 6,267,044 describes a toaster which contains heating elements optimally designed and positioned for toasting and provides the means to preheat the toasting elements to optimal thermal conditions for toasting before introducing the bread or other material to be toasted into the toasting environment. The novel toaster design disclosed in that patent includes also added means to create the optimal conditions for baking, warming, defrosting or a combination thereof. The design geometry, size and thermal environment of the relatively ubiquitous conventional toasters have not proven satisfactory for quality baking, defrosting or warming. By contrast this toaster will perform these functions faster and better than conventional baking ovens common to virtually all kitchens.

Conventional baking ovens that have been used for centuries are designed with horizontal shelves to cook food in horizontal containers that are slowly raised to elevated temperatures by heated air. Food in those containers is heated primarily by contact with the hot horizontal container or by contact with adjacent food in turn heated by contact with the container.

In more recent times motor driven fans have been introduced in ovens to circulate the air around the containers and over the top of foods in horizontal containers or horizontal shelves. Large electrical heaters have been added on the ceiling, floors and side walls of ovens to heat the air more rapidly. Horizontal shelves are provided universally as the means to hold food containers and in some cases to position bread or other foods horizontally in close proximity to a horizontal mounted heater that will toast or broil one side at a time. The efficiency of the toasting operations is very poor taking many minutes to toast—leaving a dry relatively unappetizing product. Large ovens of that sort take 10 or more minutes just to reach baking temperatures and substantial time to complete the baking because of inefficient heat transfer to the food. No provision is made in such ovens to insure intimate and direct contact with all surfaces of the food when that food is particulate or simultaneously with both sides of the food if the food is planer such as steaks, patties, and waffles. An exception to that is the rotisserie that secures larger foods on skewers and rotates them before the heated air, flames, or heated elements.

SUMMARY OF THE INVENTION

The present invention is directed to techniques for optimal baking cycles in the unique toaster of parent U.S. Pat. No. 6,267,044.

This invention describes the means and mechanism to hold particulate food within a toaster so that there is direct and intimate contact between heated air and virtually all the foods surface area to insure rapid and uniform heating of the food by naturally convective transfer from hot air at baking temperatures in combination with programmed temperature radiant energy from toasting elements and at least one auxiliary heater operating at optimum temperatures which are different from those that must be employed in an optimal toasting cycle. This programmed combination of heating by the hot air and radiation provides optimum baking rates without overheating the exposed surfaces of the food in such a manner as to create excessive or burning of the food surface. By this new methodology and by the close proximity of the heating system and the toasting elements it is possible to optimize the baking conditions for the effective baking of hundreds of uncooked or "precooked but not browned" foods available for quick bake-and-serve dishes. Unlike conventional ovens and toasters which cook slowly and unevenly, the means disclosed here bakes rapidly and uniformly simultaneously on virtually all surfaces of particulate foods creating tasty uniform temperature foods as a result.

Many ovens and so called toaster-ovens can be used for toasting but the toasted food lies flat and must be turned over to complete the toasting or to achieve relatively uniform toasting on each side. Those heater elements are not optimized for toasting. In the baking mode in conventional ovens there is little motion of the air over or through the food, rather the air is relatively quiescent. Convection ovens with fans generate a general air flow within the oven but these are not designed to circulate air through a bed of particulate food—such as frozen french fries. Conventional toasters are used today in an attempt to "cook" many of the frozen "precooked but not browned" foods by simply repeating the toasting cycle several times. The results are very disappointing creating overcooked and undercooked areas—sometimes burnt before getting sufficiently warm on the interior. Good baking requires less intense heat in order that the interior can be warmed sufficiently before the surface is overheated or burnt.

No provision is made in such ovens for vertical open baskets to hold the food and to allow air to pass through a bed of particulate food—such as frozen french fries.

There have been attempts to offer toasters that combine the toasting and baking functions such as U.S. Pat. No. 2,862,441 by W. A. Schmall (Dec. 2, 1958) assigned to General Electric. This describes a combination unit which uses movable mirrors to redirect radiant energy upward for toasting or downward to a separate baking compartment. That baking function can not be particularly effective since the heat was applied only by the mirrors to one side of the food.

In contrast to prior art the subject baking appliance is designed first as an optimal toaster. Baking is accomplished in the same space with the use of an auxiliary air heater mounted below the baking space and with the use of sophisticated electrical and electronic control of the toasting elements to equalize air temperatures and to generate natural convection currents of the heated air through and around vertically configured open mesh basket that contains the particulate food. The relative amounts of heat provided by the toasting elements and by the auxiliary air heater are electronically controlled to optimize the baking rate while avoiding excessively localized heating of the food surface by either the localized air temperature or the radiation from toasting elements. The toasting elements are segmented so that they can be heated individually or together and thus temperature is controlled so as to optimize the air temperature along the vertical face of the vertical open mesh basket which holds the food to be baked.

U.S. Pat. No. 6,267,044, the details of which are incorporated herein by reference thereto, describes many of the novel aspects of this new batch toaster in particular means for retaining the food to be toasted remote from the toasting zone until the thermal conditions in the toasting zone are optimal for toasting. By that means the bread or other food to be toasted is when entered into the toasting zone, toasted rapidly avoiding unnecessary drying of the food that would otherwise take place before the ambient thermal conditions are optimal for toasting of the food surface. Consequently the toasted food loses less internal water and can be crisp on its exterior surface while retaining more of its internal moisture. The food to be toasted is placed on a carrier of some sort and transported either manually or automatically into the toasting zone when that zone is thermally optimal for toasting.

For toasting to occur rapidly, and thus reduce the loss of moisture from the food, it is best that heat transfer be largely by radiation and less by a combination of hot air conduction and convection where heat transfer is inherently slower limited by the thin layer of air in the boundary layer adjacent the food surface. Heat transfer through such boundary layers is inherently slower while radiation can pass literally at the speed of light uninhibited from the radiant source onto the food surface. When toasting this speed is advantageous. When baking one has to monitor and control carefully the amount of radiant energy so as to avoid burning the surface of the food before the interior is adequately baked. For the interior of the food to be baked sufficiently, heat must be first transferred to the surface of the food, whence heat must travel by conduction to the middle of the food thickness. The latter takes time because the thermal conductivity of food is poor and the amount of heat transferred is driven only by the elevated surface temperature of the food. The higher the surface temperature the better up to the point where the surface is overheated and begins to burn or overcook. Consequently the surface temperature must be carefully controlled and limited to avoid burning but it must be hot enough to drive effectively the heat below the food surface where it is needed to evaporate excess water and to dehydrate and crosslink the food proteins or break chemical bonds.

Toasting, a surface phenomenon, can be forced to occur rapidly. By contrast baking rates are limited by the slow transfer of heat through the full thickness of foods. Baking cannot be rushed without danger of burning the surface. This is why toasters are notoriously poor for baking. The intensity of toasting elements must be moderated if they are used during extended baking to assist in heating the surface of foods. Radiation from toasting elements will not shine onto all food surfaces within a bed of particulate food. Shadowing effects limit the effectiveness of direct radiation. Heat for the surface of interior particulate surfaces can be well provided by convective and conductive transfer from hot air circulating around and between the particulate food.

From the above it is clear that a thermal environment ideal for toasting is not suitable for quality baking. Similarly the environment optimal for baking is totally unsatisfactory for toasting. What this inventor has discovered is that it is possible to bake efficiently and rapidly in the toasting space by using segmented electrical toasting elements operating at reduced temperature as auxiliary heaters to supplement a remote efficient heating means to elevate the air temperature within the enclosure and to generate natural convection.

current around and through a bed of particulate food adjacent to the toasting elements. The baking process can be optimized by programming independently the temperature of the segmented toasting elements and the remote heating means throughout the baking cycle. In the relatively short initial heat-up phase of the baking cycle (approximately 1½ minutes) both the upper and lower toasting segments are powered to an elevated temperature equal to or slightly lower than their temperature when toasting. This provides an initial burst of radiant and convective heat transfer that elevates the temperature of the food surface and hastens the overall temperature rise of the enclosed air, the oven walls and the baking basket. In the initial phase the remote heater also operates at or close to full power to hasten the heat-up process. Temperature within the baking space is monitored to determine when it has reached the desired baking temperature. After that time usually less than 2 minutes, the toaster elements are operated at reduced temperature and the power applied to the remote heater and to the toaster element is controlled to maintain the oven temperature at the desired temperature.

Any of a variety of electrical control means can be used to program during each portion of the baking cycle the appropriate amount of power to the toasting elements and to the remote heating means. A solid state relay controlled by an oven temperature sensing means proved particularly effective for controlling power to the various heating elements.

This inventor has found that the uniformity and speed of baking of particulate foods is enhanced significantly if the food is held in an elongated vertically oriented mesh basket of cross section sufficiently small that heated air can readily pass by naturally convective means through the basket thus contacting efficiently the surfaces of the particulate food held therein. Using a specific arrangement of heating elements and by employing a vertical basket of approximately 1¾ to 3 inch thickness (between the large vertical mesh faces) natural convection of the heated air passes rapidly through such a basket insuring that the particulate food is uniformly heated and baked throughout the basket.

A vertical configuration of the baking basket is optimal and it is consistent with the toasting geometry optimal for toasting as described herein and in parent U.S. Pat. No. 6,267,044. The elongated vertical orientation of the baking basket allows toasting heating elements of similar orientation to be used effectively to aid in the heating process and to apply heat uniformly to the face of the elongated vertical baking basket.

By using an elongated relatively high power heater (approximately 600-1000 watts) under the basket, air heated by this means rises naturally by virtue of its reduced density along the vertical faces of the mesh basket. By physically offsetting the heater slightly, on the order of a quarter inch or so from the long center line of the baking basket it was found that there is greater air flow up one side of the basket creating enough pressure difference between the faces of the basket to force a significant fraction of the hot air through the thickness of the mesh and across the surfaces of the cooler particulate food. It was found convenient to use a high temperature elongated source such as a cal-rod or a quartz-enclosed conventional hot wire heater. Because of the high temperature required for efficient heat transfer to air by such a source it may be hot enough to radiate significant energy. In that event the bottom of the mesh basket is best shielded from the direct radiation emitted by the heating source. One way to prevent the direct radiation from shining on the food basket is to locate that source in a relatively open but roofed compartment below the food basket. The mesh baking basket can be supported by, but spaced above an integral solid metal base. The bottom of the open mesh basket should optimally be positioned at least 3/8" above any such base. By these means hot air can ascend up through the mesh bottom of the basket. Either the metal base or the roof of the heater compartment will shield the food from direct radiation from the lower heater.

More than one air heater can be used below the baking basket and their positioning can be arranged to provide greater air flow up one face of the basket and then pass the other to create a pressure difference across the faces of the basket and flow through the basket.

The elongated vertical configuration for the baking basket has proven ideal because it conforms directly with the planar geometry of the toasting heater boxes and it allows air heated from below to pass uniformly upward along and across the entire large faces of the baking basket and through the particulate food. The advantages of this arrangement can be readily visualized in comparison to the use of conventional horizontal pans, horizontal trays or open mesh shelving. None of these conventional baking configurations offer the possibility simultaneously for the symmetry and proximity of auxiliary planar heaters such as the toaster elements adjacent both major faces of the basket as described here nor do they offer opportunity for simultaneously creating uniform naturally convective air currents along both sides of the food basket and through its food bed.

The effectiveness of the natural convective hot air currents through the cool food was demonstrated by detailed temperature measurements of the food temperature and the air temperature adjacent to the baking basket. It was observed when the long axis of the lower heater was offset 1/4 inch or so from the lower center line of the basket, convective air currents through the food increased sufficiently to equalize the air temperature adjacent to the food to that of the rising main air stream. When the lower heater was centered the air temperature adjacent the cool food dropped below the temperature of the air above and below the food level reflecting much less convective circulation through the food. When the heater was set off center the food cooked (reached ultimate temperature faster) and it was cooked more uniformly throughout the food bed.

This unique toaster and baker is designed to optimize separately its performance for each of these two functions. None of the known batch toasters preheat the toasting element and toasting environments before toasting to create the crispy yet moist texture. None of the known batch toasters are effective for baking. Toaster ovens are available that offer the ability to either toast or bake. They do not offer means to optimize the toasting environment before introducing the bread. Neither do they offer optimal means to bake in a vertical basket by combining the heating advantages offered by precise and programmed control of adjacent planer toasting elements and a remote heater to generate efficient heated air convection currents past and through a bed of particulate food.

THE DRAWINGS

FIG. 4 is an enlarged elevational view showing the toasting basket of FIGS. 1-3;

FIGS. 5-6 are perspective views showing the toasting basket of FIG. 4 in its opened and closed positions, respectively;

FIGS. 9-10 are views similar to FIG. 2-3 showing the oven used for baking in accordance with this invention;

DETAILED DESCRIPTION

Figure 1:
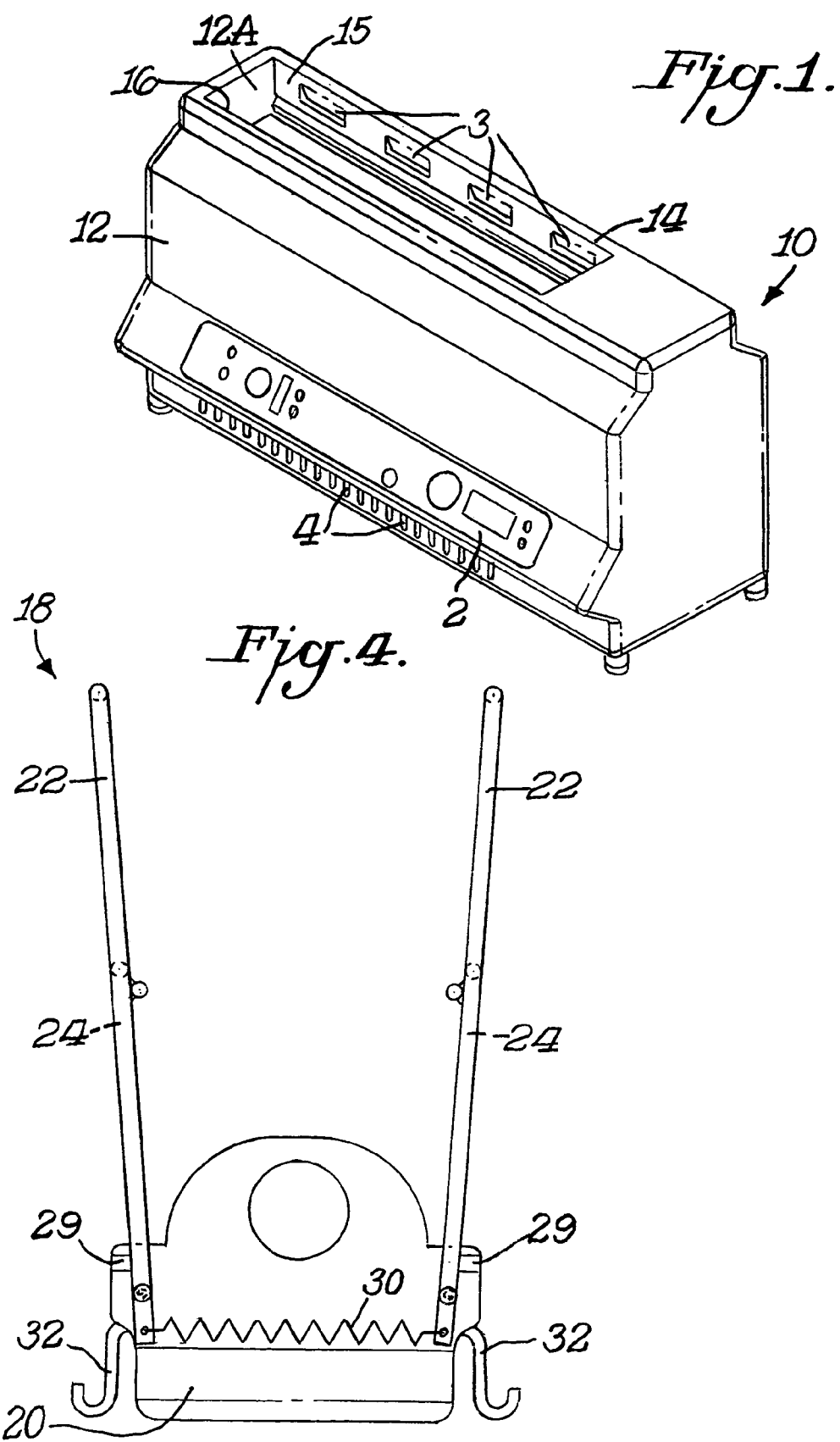
FIG. 1 is a perspective view of a baking oven in accordance with this invention.

The unique design of this toaster and baker is based upon that described in parent U.S. Pat. No. 6,267,044, the details of which are incorporated herein by reference thereto. The baking basket and the baking function are described in the following FIG. 1 is an overall view of this new toaster/baker 10. An electronic control pad 2 is provided so that the user can select either toast or bake. If toasting there is a choice of the toasting cycle either; (a) to preheat the toasting chamber before toasting or; (b) to introduce the bread or other food before heat-up. The first sequence creates a toast with crisp exterior and a moist interior, the second creates a drier toast crunchier throughout its thickness. There are controls on panel 2 also for selection of the baking temperature and time of bake.

Figure 2:
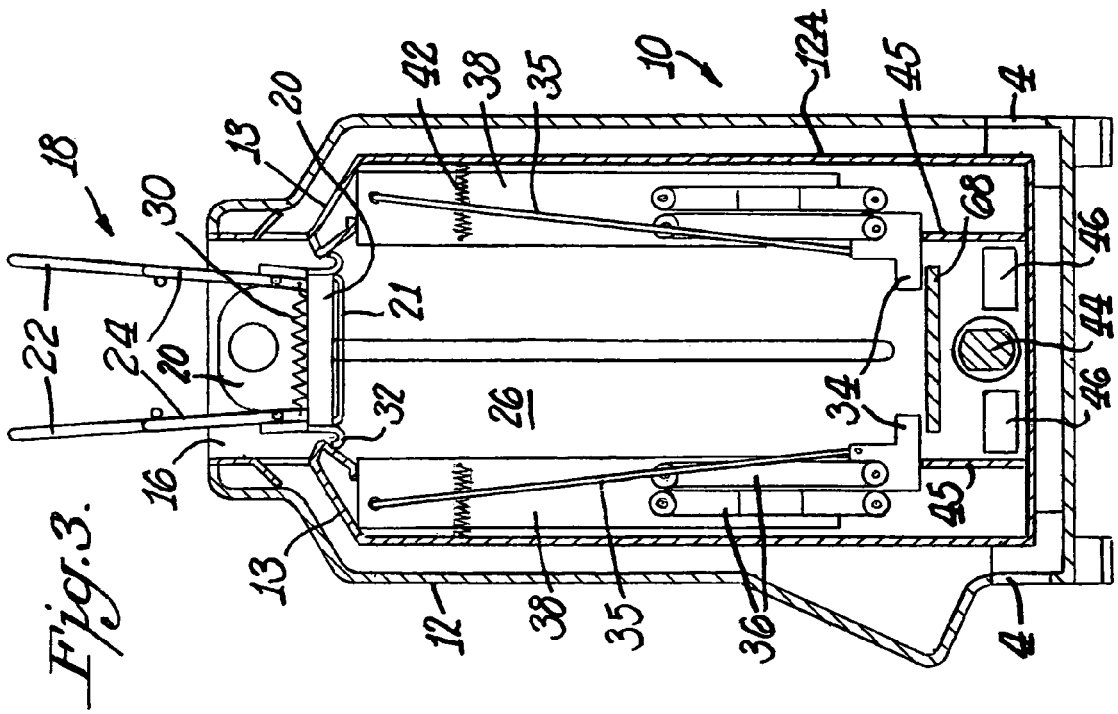
FIGS. 2-3 are cross-sectional views in elevation showing the baking element of FIG. 1 in different phases of operation.

The toaster/baker 10 outer shell 12, FIG. 2 is generally made of plastic spaced an appropriate distance outside an inner metal shell 12A that encloses the heated oven. Air intake openings 4 along the bottom of the toaster/baker 10 allow cool room air to enter and rise in the space 5, between the inner shell 12A and the outer shell 12, as shown in FIG. 2. The air removes heat from that space 5, rises as it is heated by the hot inner shell 12A and exits vents 3 located at the top of the toaster. The vents 3 can be located either as shown in FIG. 1 or on the exterior side of the opening 16 in top wall 14.

The same appliance may be converted to and from a toaster and a baking oven in accordance with the electrical controls selected and with the type of basket used for the food. Food to be toasted is inserted in a toasting basket 18 shown in FIGS. 2-6. Food items to be baked are inserted in baking basket 7, FIGS. 9-12.

Figure 3:
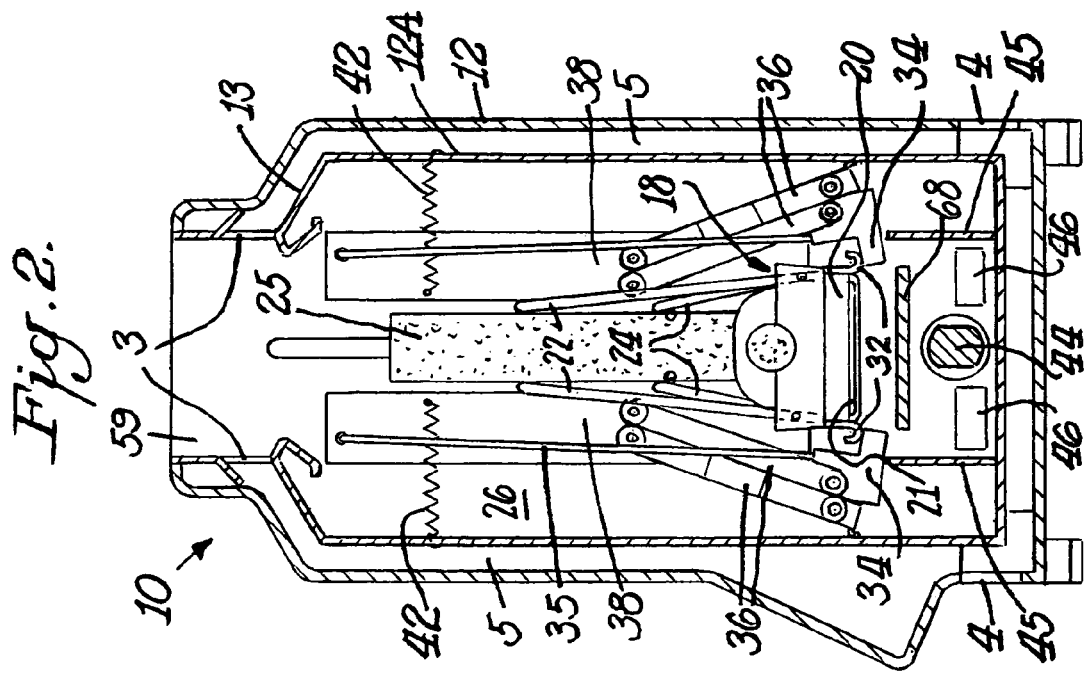

For toasting, the toasting basket 18, FIGS. 5 and 6, is inserted into the large toaster opening 16, FIG. 3 in an unheated waiting zone above toasting zone 26. The bread 25 or other food to be toasted is readily inserted in the basket 18 on tray 20, FIG. 5. The hinged rails 22 and 24 which are pivoted at their lower ends to mounting structure 28, are normally held in the open position by springs 30 that pull these rails outward as shown in FIGS. 4 and 5. When the toasting basket is lowered into the toasting zone 26 the rails are in the open position. When the toasting basket is lowered the toasting cages 38, FIGS. 2 and 3, located inside the toasting zone 26 advance toward the bread or other food in the toasting basket, the toasting cage engages the hinged rails and by means of spring rod 35 presses them lightly against the food to move the food to the center line of the basket and to hold it upright during the toasting cycle. As shown in FIGS. 4-6 stop member 29 limits the outward movement of the basket rails.

In the toasting mode food is placed in the toasting basket 18 where in one option it is held in the waiting zone until the temperature in the toasting zone 26 is optimal. The basket is then lowered by means of motor 48 of FIG. 7 into the toasting zone. As the basket is lowered the contact arms 32, FIGS. 2 and 3, attached to the toasting basket contacts the actuating arm 34 which is rigidly fastened to spring rod 35. Spring rod 35 then moves the toasting heater cages 38, FIGS. 2, 3 and 7 away from its location near wall 12A and into contact with the hinged rails 22 and 24 of the toasting basket pressing the rails into contact with the bread or other food to be toasted. Retraction springs 42 attached to the cages 38 serve to pull the toasting heater cages back and away from the toasting basket when the toasting cycle is completed. Cages 38 may move back and forth between the positions shown in FIGS. 2 and 3 in any suitable manner such as by the provision of pins 37 mounted to the lower end of each support arm 36,36 and mounted to partitions 59,59 as shown in FIGS. 8 and 8A. Parallel support arms 36, FIGS. 2 and 3, serve to keep the toaster heater cages 38 nominally vertical and parallel to the toasting basket as the cages are moved forward or retracted. It is desirable during toasting that the hot wire elements 40A and 40B in the toaster heater cage be operated at a high luminous temperature—about 1600° F. to toast as rapidly as possible, without burning, in order to toast with minimal loss of water from the bread or other food. By this means the toasting cycle can be completed in about 45 seconds to 1 minute. The other heating element 44 is an elongated heating member located below the toasting basket that is not used during the toasting cycle. As the toasting basket returns the toasted food to the top of the toaster, the bottom of the toasting basket seals off the toasting chamber so that on the next cycle the toasting zone can be reheated without heating significantly the bread or other food held in the toasting basket while the toasting zone is being reheated.

Figure 7:
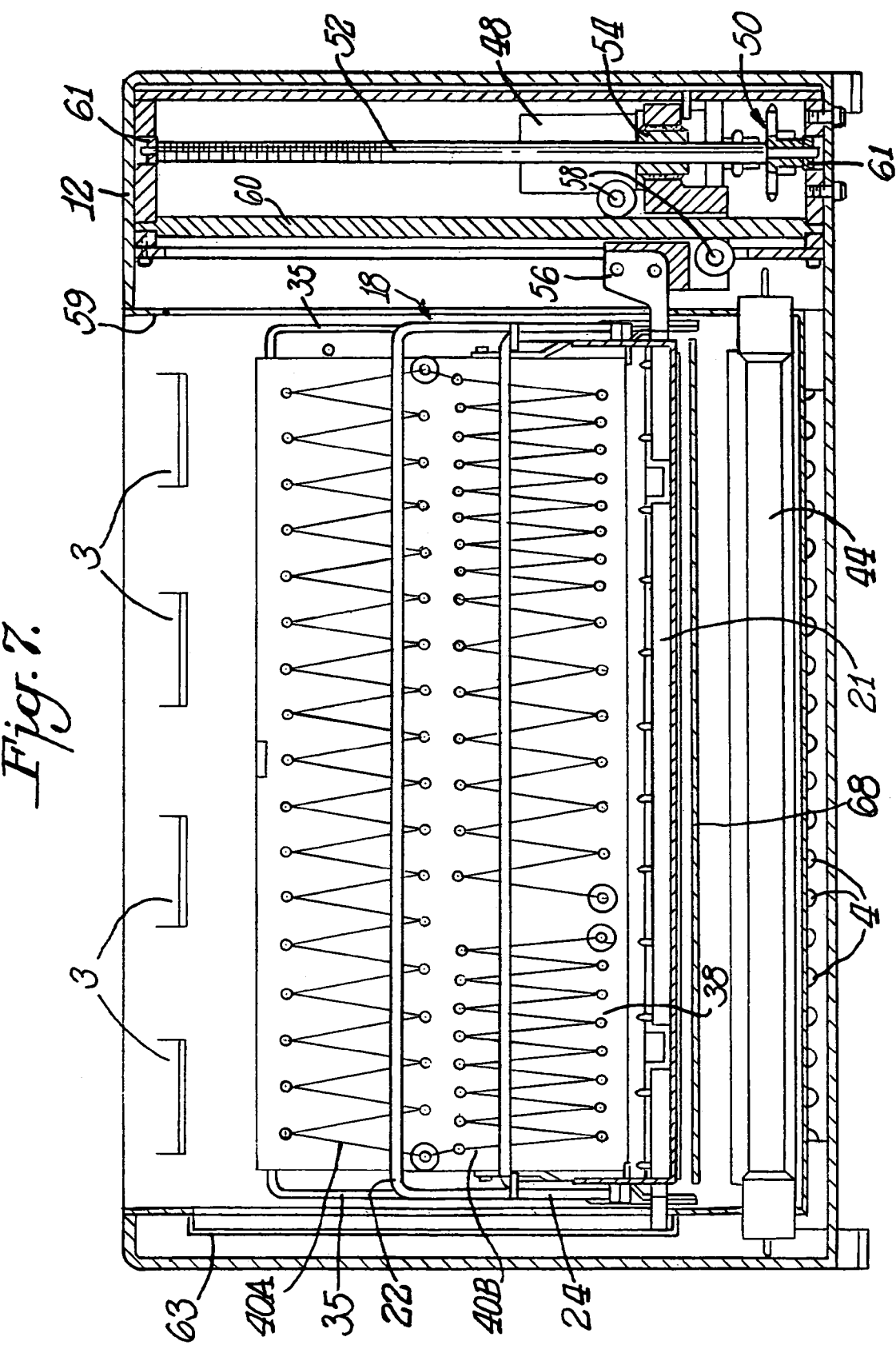
FIG. 7 is a longitudinal cross-sectional view showing the toasting basket of FIGS. 1-6 lowered into the toasting zone.
Figure 8:
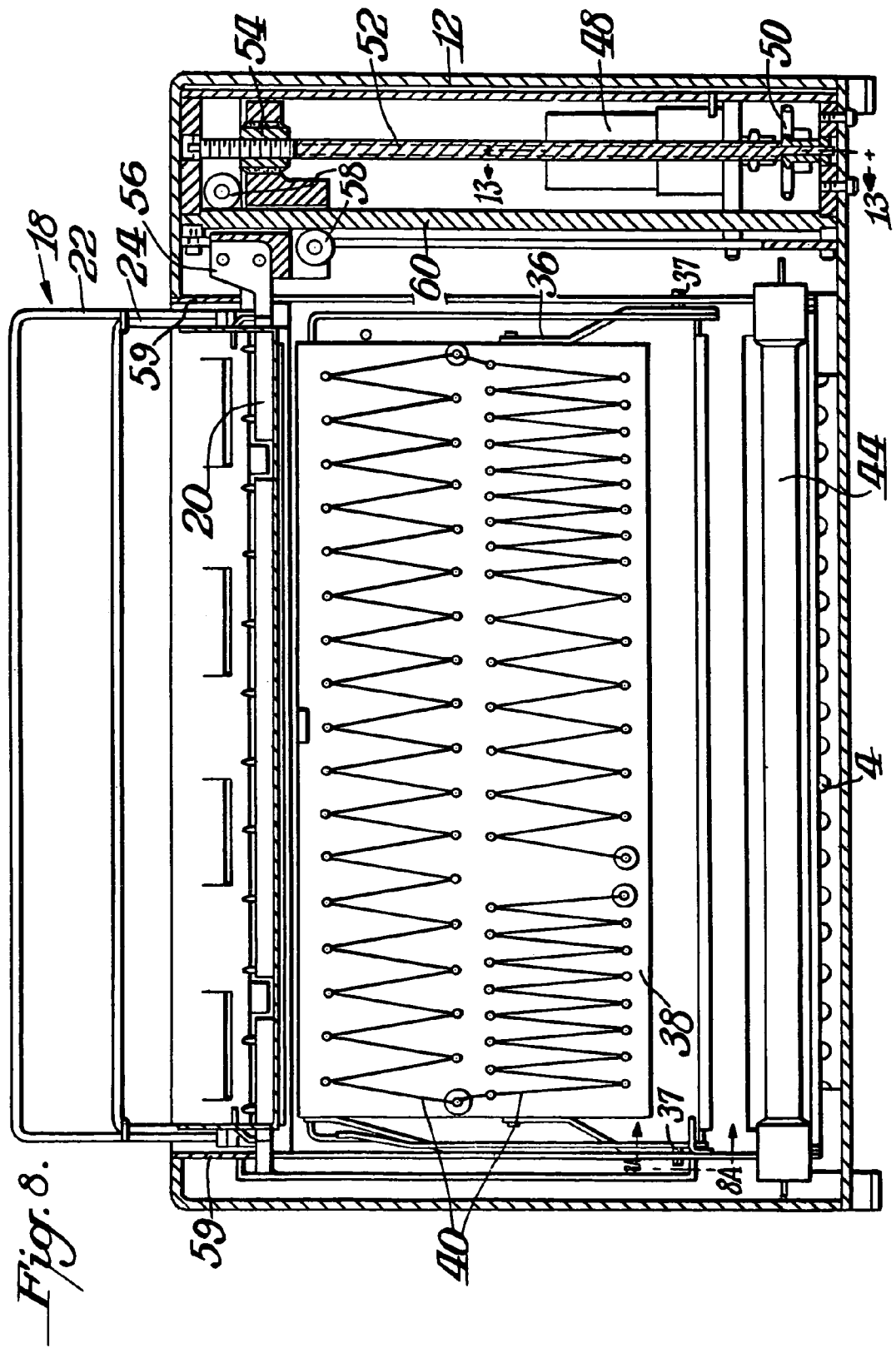
FIG. 8 is a view similar to FIG. 7 showing the toasting basket in its opened condition.
Figure 13:
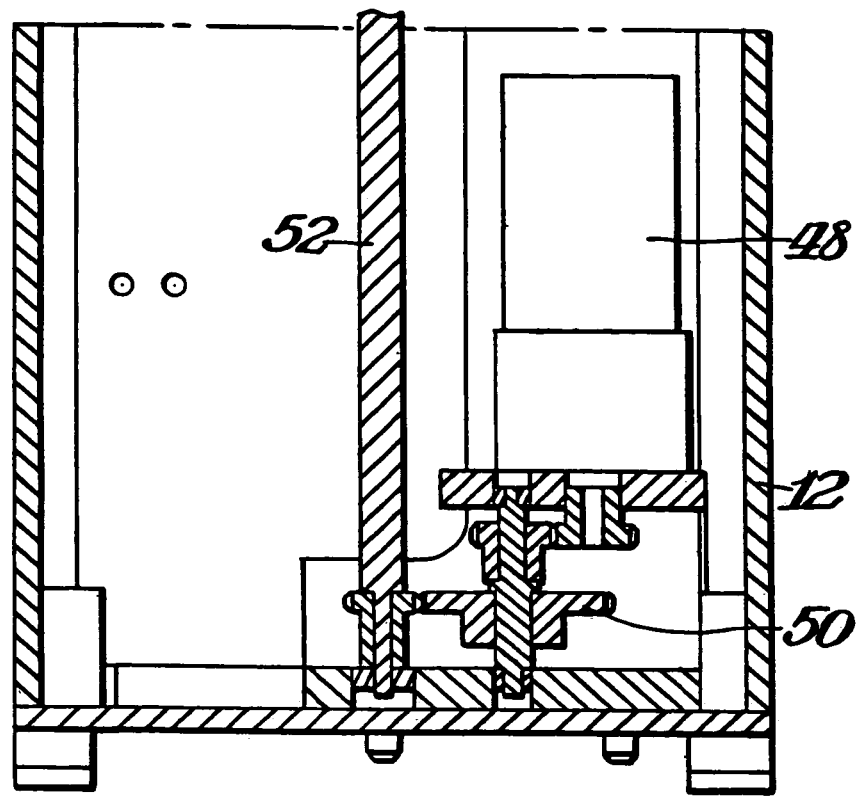
FIG. 13 is an enlarged cross-sectional view in elevation of a drive mechanism which may be used for the oven in accordance with this invention.
Figure 8A:
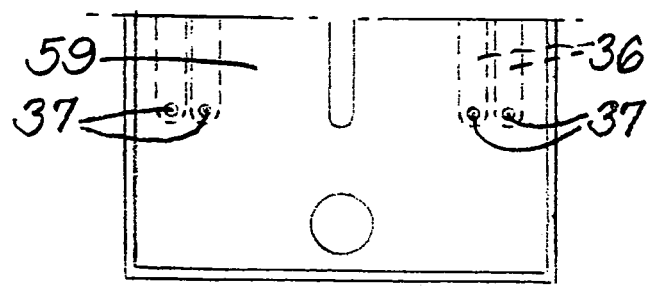
FIG. 8A is a cross-sectional view taken through FIG. 8 along the line 8A-8A.

Either the toasting basket 18 or the baking basket 7 can be mounted on the carriage support arm 21, FIGS. 2, 3 and 7 which is raised and lowered by the motor 48. The upper surface of the carriage support arm 21 is U shaped to hold securely either of the baskets 18 or 7. The support arm is cantilevered off of support bracket 56, FIG. 7 which in turn is supported on the carriage support rod 60. Two roller bearings 58 attached to the bracket 56 support the weight of the carriage support arm and either food basket with its load of food. The far end of carriage support arm 21 rides in an enclosed guide, such as slot 63, at the end of the toasting compartment to maintain horizontal alignment of the carriage support arm. The enclosed slot 63 prevents loss of heat from the oven environment. The carriage support 21 is raised or lowered by the attached threaded nut 54 that is driven up or down the threaded drive screw 52, (supported by end bearing 61) by the gear train 50 driven by the motor 48. See FIGS. 7, 8 and. 13. Partition 59 isolates the motor drive section thermally, from the heated toaster/baking environment. As needed, thermal insulation can be added to the partition wall to further reduce heating of the motor and drive elements. The carriage support arm extends from the motor compartment through a narrow elongated slot in the partition wall 59. Heat transfer through that slot can be minimized during the heating cycle (when the baskets are lowered) by incorporating solid wall end plates 64 as shown on the end of the baking basket, FIGS. 11 and 12.

Figure 11:
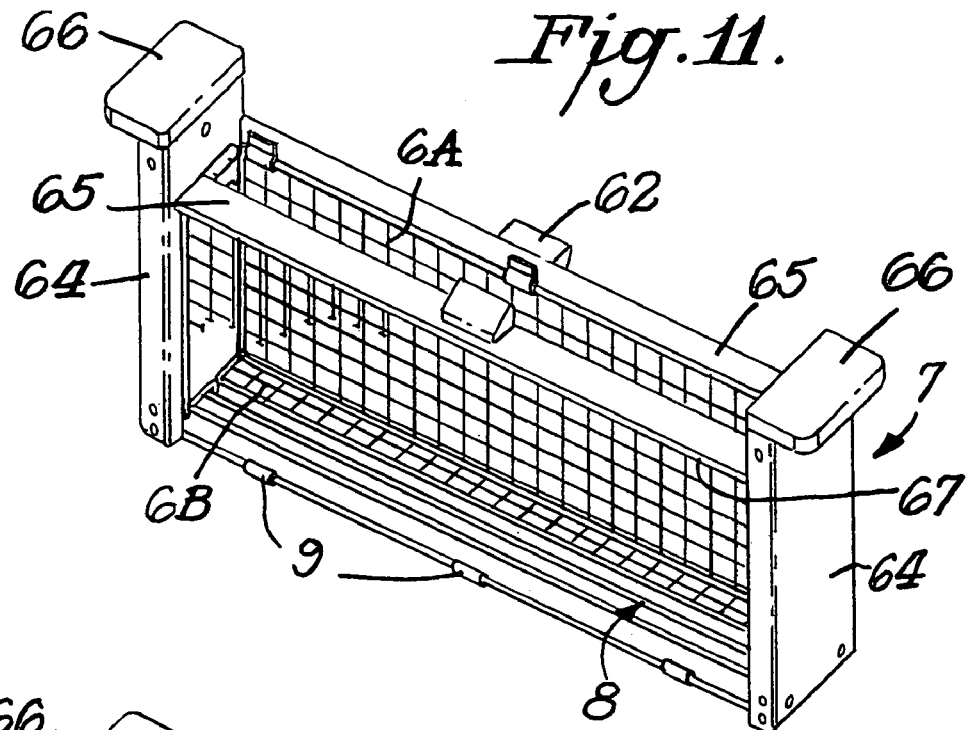
FIGS. 11-12 are perspective views of a baking basket in its closed and opened conditions, respectively.
Figure 12:
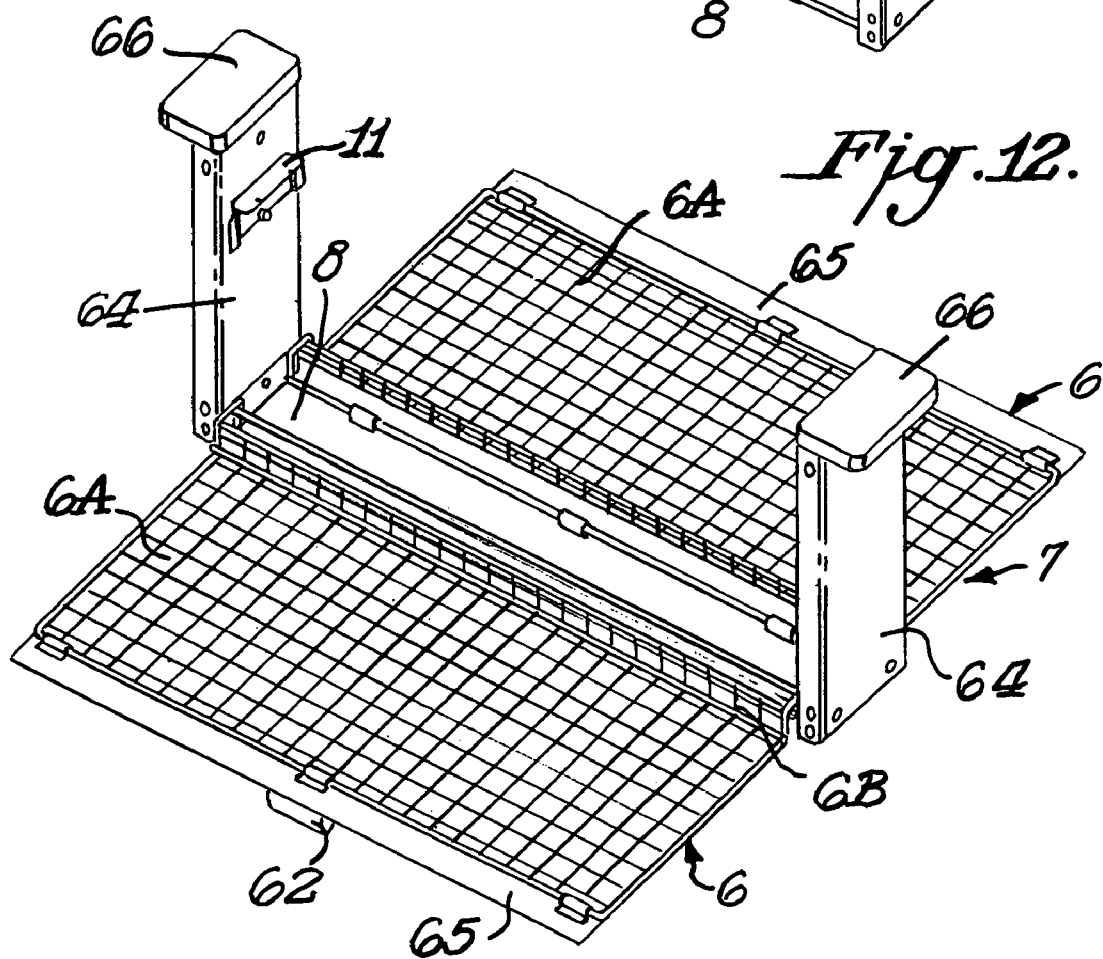

The baking basket assembly 7 is detailed in FIGS. 11 and 12. Assembly 7 is shown partially lowered into the baking zone, FIG. 10, and fully inserted in FIG. 9. This assembly has an attached solid bottom tray 8 that serves to catch and contain any grease or crumbs that will fall from particulate or other food placed in the mesh basket 6. This basket has two vertical mesh side panels 6A that are hinged 9 so that they can lie flat, FIG. 12, when removed from the toaster to assist easy removal of food after cooking. The basket has a mesh bottom 6B spaced ½ inch or so above the bottom tray 8. This spacing is critical to allow natural convection of the heated air rising from the lower chamber to circulate up through the mesh bottom and through the food in that area. The mesh construction of the large vertical faces 6A allows very free convective hot air circulation through those faces and the food. It is important of course that the width of the basket, that is the distance between the large vertical faces, does not become excessive and as a consequence restrict the convective flow rate across the food bed. The length of the basket is not critical other than it must correspond roughly to the length of the toasting elements in order that they can be effective in transferring heat along the entire length of the basket. The height of the basket likewise should not extend significantly higher than the toasting heater cage for most effective heating by the toasting heater elements. The practical thickness of the mesh basket for foods such as french fries is less than 3 inches. For looser packed foods such as onion rings a thicker basket could be used.

As stated earlier the vertical configuration of the basket is critical in order to make effective use of the vertical planer configuration of the toasting heaters and to make effective use of an auxiliary heater to induce significant natural convection currents through the food bed. This is an optimal combination which avoids the necessity to add a circulating fan to force greater airflow in order to bake uniformly.

The baking basket assembly shown in FIGS. 11 and 12 has closed end walls 64 each terminated at the top with plastic handles 66 that remain outside the baking zone and hence remain sufficiently cool to allow the basket assembly to be readily removed from the toaster.

The vertical mesh sides of the basket when raised to the vertical position are held in place by retaining clips 11 attached to end walls 64. Along the top of the basket, FIG. 11, are two hinged planar cover lids 65 which are automatically closed as the basket assembly descends into the toaster. Their closure is effected by the shape of the two closure latches 62 attached to the lid 65 as they pass shoulder 14 where the outer toaster cover 12 meets the vertical face 15 (FIG. 1) defining the top opening slot of the toaster. The two planar cover lids 65 do not completely close off the top of the basket as they drop, rather they leave an air gap slot about ¼ inch wide. This air gap allows some hot air to escape out the top of the baking zone when baking. The width and shape of that slot is optimized to insure more uniform temperature throughout the baking basket, to assist the upward flow of hot air around and through the food and to avoid creating an excessively hot layer of air just under the lids. A delicate balance of the power to the heating elements and the amount of air flow up and out of the toaster when baking is important to the quality and uniformity of the baking.

Small flanges 67 extending at an angle from the hinged baking basket lids 65 serve to minimize leakage of hot air from the baking zone along the extended top corners of the baking basket when the baking basket has been lowered into baking position. These small flanges 67 seal against structural members 13 part of the toaster structure.

FIG. 10 shows the baking basket 7 partially inserted into the toaster/baker and FIG. 9 shows the basket 7 fully inserted. The basket is lowered into place by the motor driven carriage 21. The base tray 8 of the baking basket fits within and is held by the recess of the carriage 21. The basket is positioned vertically by virtue of the close fit of basket end plates 64 with the walls of the toaster/baker top opening 16.

The motor driven carriage arm 21 extends through a slot in partition 59, FIG. 7, that encloses the toaster/baking zone and serves as a heat barrier for the motor compartment. The far end of carriage arm 21 extends into and is guided by enclosed slot 63. As the baking basket 7 is lowered into the baking zone its end plate 64 slides in close contact with partition 59 to seal off most of the air flow through the slot in partition 59 through which the carriage arm extends.

The baking heater 44, FIGS. 7-10 is located below the carriage arm 21 and under the food baskets. Heater 44 is also below horizontal shielding plate 68 that prevents direct radiant energy emitted by the lamp heater 44 from shining directly on the baking basket. It also shields the heater from any food particles that may fall from side of the food basket. On each side and slightly below that heater are crumb trays 46 that can be constructed either as two separate units or joined by a lower plate (not shown) so that they be removed together for cleaning.

In the baking mode the toasting heater cages remain in a retracted position in order to allow the air from heater 44 to pass freely between those heaters and the baking basket. The upper row of heater wires 40A on the toasting boards and the lower row 40B are not permanently connected together electrically and instead each row can be programmed to have full or partial line voltage across them or the rows can be connected in series at full or partial line voltage. By this means these electrical toasting elements can be powered on full or partially to establish the optimum amount of heat at their locations opposite the large vertical faces of the baking basket to compliment the air heating means located below the horizontal partition plate 68. That plate 68 is just large enough to shield direct radiation to the food and to protect the lamp from falling debris or food particles, but not so wide as to restrict the flow of heated air passing up from the heater in the space between the baking basket and the toaster heaters and passing convectively through the food bed. Vertical walls 45 extend parallel to heater 44 on each side of the lower heater to confine and reinforce the air currents generated by the heater. These walls 45 extend from the base of oven liner 12 to a height just short of the base of the movable toasting cages 38.

The actuating arm 34, FIGS. 9 and 10, are actuated only by the toasting basket. The baking basket does not contain the contact arms 32 needed to move the actuating arms 34 which in turn tilts spring rod 35 to move the toasting heater cages 38 in toward the toasting basket.

The typical baking cycle of this novel baking arrangement is shorter than that in convectional home ovens for two reasons. Importantly it takes much less time to heat up the baking zone. Further the improved natural convection currents created by this combined heating arrangement insures faster and more uniform heat transfer to the food surface.

Because of these advantages, with this new baking arrangement the total time required for oven heat-up plus baking is slightly less than the time required just for baking in a conventional small toaster oven. The following example illustrates the advantage found in elapsed time when baking partially cooked but frozen foods in this new toaster/baker.

Frozen French Fries
  Commercially available frozen french fries. These were precooked but not browned by manufacturer before freezing. These were removed frozen from commercial package and placed in oven promptly.
  Conventional Toaster Oven—(Black & Decker TR0400, 1550 Watts)
  Heat-up time—5 minutes to reach 450° F.
  Baking time—30 minutes single layer—10 ounces French fries (single layer on metal tray)
  Total time—35 minutes to bake thoroughly
  Toaster/Baker (described above—20 ounces French fries; twice the quantity of french fries held by the Black & Decker toaster oven) (1480 watts maximum) (basket size: 10.5 inches long, 5 inches high, 1.6 inch between vertical mesh faces)
  Heat-up time—1½ minutes to reach 450° F.
  Bake time—26 minutes
  Total time—28 minutes to bake thoroughly
  [It is evident that this new baking arrangement cooked in less time twice as many french fries as the conventional toaster/oven.]

The following baking sequence was used when baking with this new baking apparatus:
  Heat-Up Period
  Both upper and lower toaster elements 40A and 40B in both toasting cages were energized on full voltage for 1½ minutes. The bottom baking heater (680 watts) was also on at full voltage for the heat-up period.
  Baking Cycle
  Following the heat-up cycle, the two lower toasting elements 40B (800 watts) connected in series electrically and the bottom baking heater 44 were each powered at 120 Volts by a solid state relay, that adjusted the amount of power as necessary to maintain temperatures at the set point.

The amount of power delivered during the baking cycle to these heaters subsequent to the heat-up period was automatically controlled by the solid state relay in accordance with the electrical signal received from a conventional thermocouple junction located on a post attached to one toaster cage about ½" in front of the toasting heater elements. During the baking cycle the amount of required power was reduced to only a fraction of the initial power as the oven and food surface reached the preset control bake temperature. The control temperature for baking was in each test selected and set manually at the temperature recommended by the packager of the frozen food product.

A saving of about 20% in total time compared to conventional ovens and toaster ovens was measured on a variety of frozen foods including: onion rings, french toast nuggets (450° F.), hot pockets (350° F.), cheese toast (425° F.), croissant pockets (with sausage and cheese 350° F.) and hash brown potatoes (450°).

What is claimed is:

1. A method of baking a food item comprising providing an oven having a housing with a heating zone in the interior of the housing and with an unheated waiting zone in the housing separate from the heating zone, providing an open mesh baking basket having a pair of open mesh side walls, placing a food item in the baking basket, placing the baking basket in the waiting zone, heating the heating zone by at least one heater member at the bottom of the heating zone and by at least one heater element at a location above the heater member in the heating zone, maintaining the baking basket in the waiting zone until a predetermined temperature is reached in the heating zone, lowering the baking basket into the heating zone when the predetermined temperature is reached with the heating element located juxtaposed at least one vertical mesh side of the baking basket and with the heater member located below the baking basket, removing the baking basket from the heating zone after the food item has been baked, and then removing the food item from the baking basket.

2. The method of claim 1 wherein the heater member is elongated and is longitudinally disposed below the heating basket.

3. The method of claim 1 including disposing a heater element juxtaposed each vertical mesh side of the baking basket.

4. The method of claim 3 wherein the heater member is elongated and is longitudinally disposed below the heating basket.

5. The method of claim 4 including disposing each heater element in a vertical orientation.

6. The method of claim 1 including locating the waiting zone at the top of the housing.

7. The method of claim 1 including locating the heater member below the baking basket when said baking basket is in the heating zone with the heater member offset from a longitudinal center line of the basket.

8. The method of claim 1 including shielding the bottom of the baking basket from direct radiation emitted by the heater member.

9. The method of claim 8 wherein the bottom of the basket is shielded by locating the heater member in a relatively open but roofed compartment below the baking basket.

10. The method of claim 8 wherein the basket is supported by and spaced above a solid base to shield the bottom of the baking basket.

11. The method of claim 1 including locating heating elements at the sides of the heating zone in a planar configuration facing the side walls of the baking basket when the baking basket is in the heating zone.

12. The method of claim 11 including providing an auxiliary heater below the-baking basket when the baking basket is in the toasting zone.

13. The method of claim 1 including providing the baking basket with a solid bottom tray to catch and contain grease or crumbs that may fall from the food item.

14. The method of claim 13 wherein said baking basket has a mesh bottom located above and spaced from said bottom tray to allow natural convection of heated air rising to circulate through the mesh bottom.

15. The method of claim 1 wherein the baking basket side walls are hinged to lie flat so as to facilitate removal of the food item after cooking.

16. The method of claim 15 wherein the baking basket includes closed end walls having handles to facilitate the handling of the baking basket.

* * * * *